(12) United States Patent
Chen et al.

(10) Patent No.: US 12,437,126 B1
(45) Date of Patent: Oct. 7, 2025

(54) METHOD OF RANDOMLY GENERATING THREE-DIMENSIONAL PROFILES OF RAILWAY BALLAST PARTICLES

(71) Applicant: Southwest Jiaotong University, Chengdu (CN)

(72) Inventors: Rong Chen, Chengdu (CN); Kai Liu, Chengdu (CN); Ping Wang, Chengdu (CN); Jianxing Liu, Chengdu (CN); Zijun Cao, Chengdu (CN); Jiayan Nie, Chengdu (CN); Xuetong Wang, Chengdu (CN); Hui Peng, Chengdu (CN); Min Xue, Chengdu (CN); Yiling Liu, Chengdu (CN)

(73) Assignee: Southwest Jiaotong University, Chengdu (CN)

( * ) Notice: Subject to any disclaimer, the term of this patent is extended or adjusted under 35 U.S.C. 154(b) by 0 days.

(21) Appl. No.: 19/046,539

(22) Filed: Feb. 6, 2025

(30) Foreign Application Priority Data

May 22, 2024 (CN) .......................... 202410640581.9

(51) Int. Cl.
 *G06F 30/13* (2020.01)
 *G06F 30/17* (2020.01)
 *G06N 7/01* (2023.01)

(52) U.S. Cl.
 CPC .............. *G06F 30/13* (2020.01); *G06F 30/17* (2020.01); *G06N 7/01* (2023.01)

(58) Field of Classification Search
 CPC ............ G06F 30/13; G06F 30/17; G06N 7/01
 See application file for complete search history.

(56) References Cited

FOREIGN PATENT DOCUMENTS

CN 107169981 A * 9/2017 .............. G06T 7/13

OTHER PUBLICATIONS

Nie JY, Li DQ, Cao ZJ, Zhou B, Zhang AJ. Probabilistic characterization and simulation of realistic particle shape based on sphere harmonic representation and Nataf transformation. Powder Technology. Jan. 15, 2020;360:209-20. (Year: 2020).*

Su D, Yan WM. Prediction of 3D size and shape descriptors of irregular granular particles from projected 2D images. Acta Geotechnica. Jun. 2020;15(6):1533-55. (Year: 2020).*

(Continued)

*Primary Examiner* — Chuen-Meei Gan
(74) *Attorney, Agent, or Firm* — Bayramoglu Law Offices LLC

(57) ABSTRACT

Provided is a method of reconstructing and randomly generating three-dimensional profiles of railway ballast particles. The method focuses on two aspects of accurate characterization and random generation of the railway ballast profiles. The method specifically includes: first, obtaining a lot of railway ballast profile samples to form a railway ballast library, and describing the uncertainty of the railway ballasts as much as possible; introducing a spherical harmonic function method into the three-dimensional profile characterization of railway ballast particles in order to accurately reconstruct the railway ballast particle profiles; and finally, establishing a joint probability density function of a spherical harmonic function spectrum to randomly generate railway ballast particles.

2 Claims, 1 Drawing Sheet

Original profile    1-order    5-order    10-order    15-order    20-order

(56) References Cited

OTHER PUBLICATIONS

Liu GZ, Dai JC, Wang P, Chen R, Liu H, Wei XK. Analysis of the breakage parameters of railway ballast based on the discrete element method. Journal of Zhejiang University—Science A. Mar. 2023;24(3):257-71. (Year: 2022).*

Bian Xue-Cheng, et al., Three-Dimensional Discrete Element Analysis of Railway Ballast's Shear Process Based on Particles' Real Geometry, Engineering Mechanics, 2015, pp. 64-75,83, vol. 32 No. 5.

Gao Liang, et al., Discrete element method of improved performance of railway ballast bed using elastic sleeper, J. Cent. South Univ., 2015, pp. 3223-3231, vol. 22.

Hai Huang, Discrete Element Modeling of Railroad Ballast Using Imaging Based Aggregate Morphology Characterization, University of Illinois at Urbana-Champaign, 2010, pp. 1-210.

Buddhima Indraratna, et al., Experimental and Numerical Study of Railway Ballast Behavior under Cyclic Loading, Int. J. Geomech., 2010, pp. 136-144, vol. 10 No. 4.

Wee Loon Lim, Beng (Hons), Mechanics of Railway Ballast Behaviour, The University of Nottingham, 2004, pp. 1-195.

Yang Wang, et al., BallastGAN: Random generation of ballast particle contour based on generative adversarial networks, Construction and Building Materials 411, 2024, pp. 1-13, 134521.

Xu Yang, Mechanical Behavior and Deterioration Mechanism Research on Railways Ballast Bed, Beijing Jiaotong University, 2016, pp. 1-203.

Zhao Lianheng, et al., Reconstruction of granular railway ballast based on inverse discrete Fourier transform method, Granular Matter, 2017, pp. 1-17, vol. 19 No. 74.

* cited by examiner

METHOD OF RANDOMLY GENERATING THREE-DIMENSIONAL PROFILES OF RAILWAY BALLAST PARTICLES

CROSS-REFERENCE TO THE RELATED APPLICATIONS

This application is based upon and claims priority to Chinese Patent Application No. 202410640581.9, filed on May 22, 2024, the entire contents of which are incorporated herein by reference.

TECHNICAL FIELD

The present disclosure relates to the technical field of rail traffic, and in particular to a method of reconstructing and randomly generating three-dimensional profiles of railway ballast particles.

BACKGROUND

Ballast bed is composed of ballast particles with a specific gradation, and the mechanical properties of the ballast bed play an important role in ensuring railway safety. Because the indoor and outdoor tests have great limitations in the study of the fine-mechanical behavior of the ballast bed, the Discrete Element Method (DEM) take into full account the contact characteristics between railway ballast particles. Therefore, scholars have carried out a lot of numerical simulation studies on the mechanical properties of the ballast bed based on the discrete element method. The profile serves as one of the most important basic characteristics of railway ballast particles. It has been found that the shape of the railway ballast particles has a significant impact on the interaction excitation between railway ballasts and the macroscopic mechanical behavior of the ballast bed during the simulation of the discrete element method. The reconstruction and accurate characterization of railway ballast particles have become an important factor affecting the simulation accuracy.

At present, Indraratna proposes to use two-dimensional bonded disc particles to simulate the irregular shape of the railway ballast particles in terms of reconstruction of railway ballast particles, and to study the breakage mechanism of railway ballast particles under the cyclic loading action through triaxial tests. Lim proposes to use a regular clump consisted of a plurality of spheres to simulate the railway ballasts. All of the above studies reconstruct particles based on the limited railway ballast profiles. However, there is still a big difference from the real railway ballast particles, and the randomness of the railway ballast profiles is ignored. Therefore, Zhao proposes to reconstruct the two-dimensional profiles of the real railway ballast particles based on the inverse discrete Fourier transform method. Zhang, Gao et al propose to obtain the railway ballast profiles based on a digital imaging method and achieve the simulation modeling of the ballast bed, but this method has a large scanning workload and a low modeling efficiency. In order to solve the above problems, Huang proposes to inverse the railway ballast particle profiles based on a three-dimensional perspective reconstruction method, establish a railway ballast library containing 11 typical railway ballast profiles, and randomly extract and establish a discrete element model. Bian proposes a method of obtaining multi-angle images of coarse-grained materials to be tested by two plane mirrors using the principle of specular reflection, carrying out three-dimensional reconstruction after completing self-calibration according to the program algorithm to obtain the three-dimensional model of the restored coarse-grained materials, and establishing a conversion solution between the model size and the real geometric size, so as to complete the geometric characteristics and grading evaluation of the coarse-grained materials. Xiao et al. propose a new model named BallastGAN, which is used to randomly generate railway ballast particle profiles. The model uses fractal dimension regularization, and optimizes the loss function of the discriminator under the framework of StyleGAN3. Xu proposes to analyze the characteristics of the two-dimensional profiles of the railway ballasts based on the method of analyzing the normalized boundary chain code Fourier descriptor, and obtain the three-dimensional profiles of the railway ballasts in combination with the generated two-dimensional profiles using the intersection method of double plane mirrors, and establish a railway ballast library containing 28 railway ballasts.

The profiled serves as one of the most important basic characteristics of railway ballast particles. The shape of the railway ballast particles has a significant impact on the interaction excitation between railway ballasts and the macroscopic mechanical behavior of the ballast bed during the simulation of the discrete element. Therefore, it is necessary to carry out corresponding studies on the reconstruction and accurate characterization of the railway ballast particle profiles.

However, in the prior technology, although the randomness of the railway ballast profiles has been preliminarily characterized, there are few samples of the railway ballast profiles obtained based on scanning. It is difficult to describe the uncertainty of the railway ballasts. At the same time, if the three-dimensional profiles are inverted through the two-dimensional profiles, the error will be enlarged, and it is difficult to ensure the consistency of characteristics between the generated railway ballast profiles and the actual railway ballast profiles. The reduction accuracy is limited.

Therefore, in view of the fact that it is difficult to quantify the uncertainty of the particle shape using the current particle profile characterizing methods and the railway ballast profiles generated by the established three-dimensional railway ballast library is limited, it is urgent to propose a method of reconstructing and randomly generating three-dimensional profiles of railway ballast particles.

SUMMARY

In order to solve the problems existing in the prior technology, the present disclosure provides a method of reconstructing and randomly generating three-dimensional profiles of railway ballast particles. The method includes: first, obtaining a lot of railway ballast profile samples to form a railway ballast library, and describing the uncertainty of the railway ballasts as much as possible; introducing a spherical harmonic function method into the three-dimensional profile characterization of railway ballast particles in order to accurately reconstruct the railway ballast particle profiles; and finally, establishing a joint probability density function of the spherical harmonic function spectrum to randomly generate railway ballast particles, thus solving the problems mentioned in the above background.

In order to achieve the above purpose, the present disclosure provides the following technical solution: a method of reconstructing and randomly generating three-dimensional profiles of railway ballast particles, including the following steps:

S1, obtaining three-dimensional profile data of railway ballasts;

S2, reconstructing railway ballast profiles based on a spherical harmonic function method;

S3, characterizing a probability of railway ballast particles; and

S4, randomly generating the railway ballast particles.

Preferably, Step S1 includes: randomly selecting 300 railway ballasts, rotating a base to rotate railway ballasts by 360 degrees along an axis perpendicular to the base, setting target points on surfaces of railway ballasts at the same time, rotating the railway ballast particles for a plurality of times and scanning the railway ballast particles at different angles for a plurality of times, splicing results of scanning for a plurality of times in a target point positioning manner, finally, obtaining a space coordinate information set $$V_j = \left(x_j^k, y_j^k, z_j^k\right)$$

of a surface point cloud in a Cartesian coordinate system, and converting the space coordinate information set of the surface point cloud in the Cartesian coordinate system into a space coordinate information set $$S_j = \left(r_j^k, \theta_j^k, \varphi_j^k\right)$$

in a spherical coordinate system, where j is the particle number, and k is the point cloud number.

Preferably, Step S2 specifically includes: selecting N=15 to carry out research work based on a theoretical method of a spherical harmonic function, according to the space coordinate information set $$S_j = \left(r_j^k, \theta_j^k, \varphi_j^k\right)$$

of the surface point cloud in the spherical coordinate system, solving a spherical harmonic function coefficient of each railway ballast particle by the least square fitting, and finally obtaining a spherical harmonic function coefficient set $$\hat{C}_{j,n}^m$$

with 300 samples, which is defined by the formula:

$$\hat{C}_{j,n}^m = \left(\hat{C}_{j,n}^{-n}, \hat{C}_{j,n}^{-n+1}, \ldots, \hat{C}_{j,n}^0, \ldots, \hat{C}_{j,n}^{n-1}, \hat{C}_{j,n}^n\right) \quad (1)$$

$$j = 1, 2, \ldots, 300; n = 0, 1, \ldots, 15$$

where j is the particle number, and n and m correspond to the order and degree of expansions of the spherical harmonic function, respectively; and reconstructing the railway ballast particles by substituting the obtained spherical harmonic function coefficient set $$\hat{C}_{j,n}^m$$

into the following formula defined by a following formula:

$$r(\theta, \varphi) = \sum_{n=0}^{N} \sum_{m=-n}^{n} C_n^m Y_n^m(\theta, \varphi) \quad (2)$$

$$C_n^m = a_n^m + b_n^m i \quad (3)$$

$$C_n^{-m} = (-1)^m (C_n^m)^* \quad (4)$$

$$Y_n^m(\theta, \varphi) = \sqrt{\frac{(2n+1)(n-m)!}{4n(n+m)!}} P_n^m(\cos\theta) e^{im\varphi} \quad (5)$$

where θ is a colatitude angle, which has a domain of definition of [0, π], φ is an azimuth angle, which has a domain of definition of [0, 2π], $$C_n^m$$

is a coefficient corresponding to the spherical series of an n-order and m-degree spherical harmonic function, $$a_n^m$$

and $$b_n^m$$

are the real part and the imaginary part of the spherical harmonic function coefficient, respectively, (•)* is the conjugate transpose, and $$Y_n^m$$

is the spherical series of an n-order and m-degree spherical harmonic function.

Preferably, Step S3 specifically includes:

S31, substituting the obtained spherical harmonic function coefficient set $$\hat{C}_{j,n}^m$$

into Formula (6) to calculate and solve the spherical harmonic function spectrum $L_{j,n}$;

$$L_{j,n} = \sqrt{\sum_{m=-n}^{n} \left\|\hat{C}_{j,n}^m\right\|^2} \quad n = 0, 1, \ldots, N \quad (6)$$

where $L_{j,n}$ is an n-order spherical harmonic function spectrum of a j-th particle $$\hat{C}_{j,n}^m$$

is an n-order and m-degree spherical harmonic function coefficient of a j-th particle, and ‖•‖ is a second-order Euclidean norm of a spherical harmonic coefficient vector;

S32, carrying out statistical analysis of a frequency histogram on $L_1$-$L_{15}$ of 300 railway ballast particles, and due to a distribution approximately a gamma distribution, selecting the gamma distribution for fitting; and S33, selecting the gamma distribution to construct a marginal probability density function $f=f_1(l_1)$, $f_2(l_2), \ldots, f_n(l_n)$ of the spherical harmonic function spectrum of each order, and thus characterizing the probability of the spherical harmonic function spectrum of each order of the railway ballast particles.

Preferably, Step S4 includes:

S41, establishing a joint probability density function of the spherical harmonic function spectrum through Nataf theory according to the obtained marginal probability density function $f=f_1(l_1), f_2(l_2), \ldots, f_n(l_n)$ of the spherical harmonic function spectrum of each order to obtain the joint probability density function of the spherical harmonic function, as shown in Formula (7):

$$f(L_1, L_2, \ldots, L_N) = f_1(l_1)f_2(l_2)\ldots f_n(l_n)\frac{\phi_n(y, \rho_0)}{\phi(y_1)\phi(y_2)\ldots \phi(y_n)} \quad (7)$$

where $\phi_n(y, \rho_0)$ is the joint probability density function of the standard normal distribution, and $\rho_0$ is a correlation coefficient of n-dimensional standard normal distribution;

S42, obtaining the spherical harmonic function spectrum $\hat{L}_q=[\hat{L}_{1,q}, \hat{L}_{2,q}, \ldots, \hat{L}_{n,q}]^T$ of the target number $N_L$ according to the obtained joint probability density function, $q=1, 2, \ldots, N_L$; establishing a relationship between 16 spherical harmonic function spectra and 256 spherical harmonic function coefficients to generate particles, wherein the specific conversion formula is as shown in Formula (8) and Formula (9):

$$\hat{C}_{n,q}^m = \begin{cases} \frac{\hat{L}_{n,q}}{\overline{L}_{n,q}}(a_{n,q}^m + b_{n,q}^m i) & m > 0 \\ \frac{\hat{L}_{n,q}}{\overline{L}_{n,q}}(a_{n,q}^0) & m = 0 \\ \frac{\hat{L}_{n,q}}{\overline{L}_{n,q}}(-1)^m(a_{n,q}^m + b_{n,q}^m i) & m < 0 \end{cases} \quad (8)$$

$$\overline{L}_{n,q} = \sqrt{(a_{n,q}^0)^2 + \sum_{m=1}^{n}[2(a_{n,q}^0)^2 + 2(b_{n,q}^0)^2]} \quad (9)$$

where $a_{n,q}^m$ and $b_{n,q}^m$ are random numbers following the uniform distribution from 0 to 1;

S43, generating the railway ballast particles rapidly and randomly according to the generated spherical harmonic function coefficient $\hat{C}_{n,q}^m$ in combination with Formula (2) to Formula (5).

The present disclosure has the following beneficial effect. The method includes randomly selecting 300 railway ballasts for scanning to obtain railway ballast profile samples, describing the uncertainty of the railway ballasts as much as possible, and introducing a spherical harmonic function theory to carry out three-dimensional reconstruction on the railway ballast profiles. When the order of the spherical harmonic function is up to 15, the restored railway ballast profiles are more accurate in order to accurately reconstruct the railway ballast particle profiles. At the same time, a joint probability density function of a spherical harmonic function spectrum is established based on Nataf change to characterize the uncertainty of the railway ballast profiles and generate railway ballast particles randomly and rapidly.

DETAILED DESCRIPTION OF THE EMBODIMENTS

The technical solution in the embodiments of the present disclosure will be clearly and completely described with reference to the attached drawings hereinafter. Obviously, the described embodiments are only some of the embodiments of the present disclosure, rather than all of the embodiments. Based on the embodiments in the present disclosure, all other embodiments obtained by those skilled in the art without paying creative labor belong to the scope of protection of the present disclosure.

Figure 1:
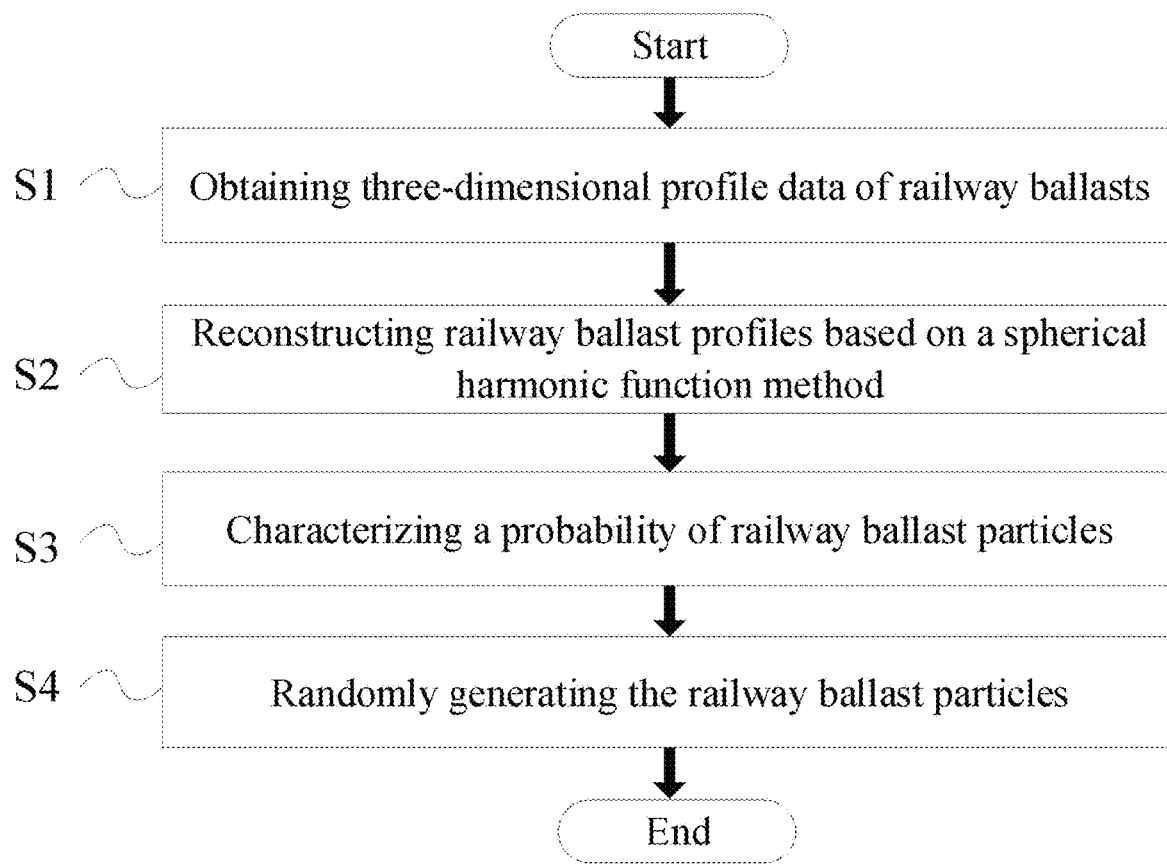
FIG. 1 is a schematic flow chart of steps of a method of reconstructing and randomly generating three-dimensional profiles of railway ballast particles according to the present disclosure.
Figure 2:
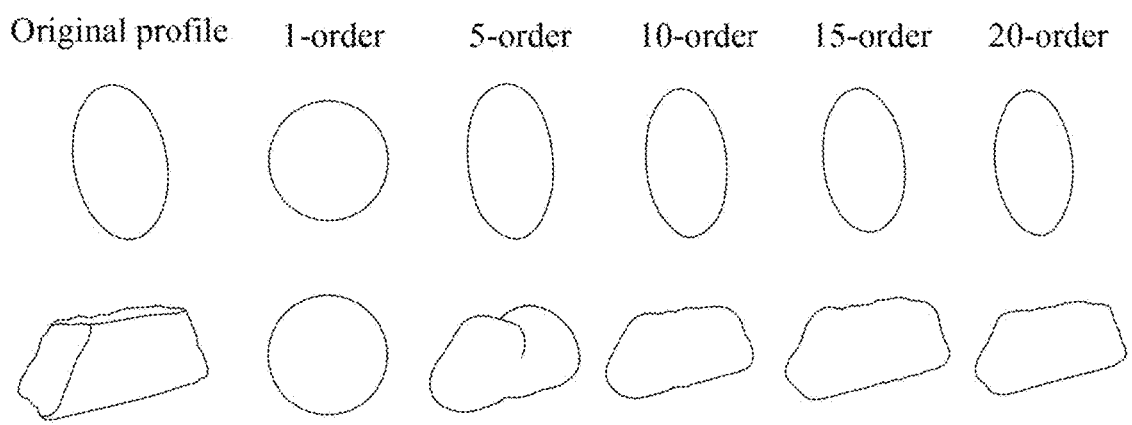
FIG. 2 is a schematic diagram of comparison of profile reconstruction of different orders of a spherical harmonic function.

Refer to FIG. 1 to FIG. 2. The present disclosure provides a technical solution: a method of reconstructing and randomly generating three-dimensional profiles of railway ballast particles. As shown in FIG. 1, the method includes the following steps S1-S4.

S1: three-dimensional profile data of railway ballasts is obtained.

300 railway ballast particles are randomly selected. A base is rotated to rotate the railway ballasts by 360 degrees along an axis perpendicular to the base. Target points are set on surfaces of the railway ballasts at the same time. The railway ballast particles are rotated for a plurality of times, and are scanned at different angles for a plurality of times. Results of scanning for a plurality of times are spliced in a target point positioning manner. Finally, a space coordinate information set $V_j = (x_j^k, y_j^k, z_j^k)$ or a surface point cloud in a Cartesian coordinate system is obtained, and is converted into a space coordinate information set $$S_j = (r_j^k, \theta_j^k, \varphi_j^k)$$

in a spherical coordinate system, where j is the particle number, and k is the point cloud number.

$$x_j^k, y_j^k, z_j^k$$

are the x,y,z coordinates of the i-th particle in the k-th point cloud in the Cartesian coordinate system;

$$r_j^k, \theta_j^k, \varphi_j^k$$

are the distance to the origin, the cosine angle, and the azimuth angle of the i-the particle in the k-th point cloud in the spherical coordinate system, respectively.

S2: railway ballast profiles are reconstructed based on a spherical harmonic function method.

FIG. 2 shows the comparison of profile reconstruction of different orders of the spherical harmonic function based on a theoretical method of the spherical harmonic function, according to the space coordinate information set $$S_j = (r_j^k, \theta_j^k, \varphi_j^k)$$

of the surface point cloud in the spherical coordinate system obtained in Step S1. The present disclosure selects the order N=15 of the spherical harmonic function to carry out research work. Spherical harmonic function coefficients of each railway ballast particle are solved by the least square fitting, and finally a spherical harmonic function coefficient $$\hat{C}_{j,n}^m$$

with 300 samples is obtained. The formula is as follows:

$$\hat{C}_{j,n}^m = \left( \hat{C}_{j,n}^{-n}, \hat{C}_{j,n}^{-n+1}, \dots, \hat{C}_{j,n}^{0}, \dots, \hat{C}_{j,n}^{n-1}, \hat{C}_{j,n}^{n} \right) \quad (1)$$

$$j = 1, 2, \dots, 300; n = 0, 1, \dots, 15$$

where j is the particle number, and n and m correspond to the order and degree of expansion of the spherical harmonic function, respectively.

the obtained spherical harmonic function coefficient set $$\hat{C}_{j,n}^m$$

is substituted into the following formulas to reconstruct the railway ballast particles, wherein the formulas are as follows:

$$r(\theta, \varphi) = \sum_{n=0}^{N} \sum_{m=-n}^{n} C_n^m Y_n^m(\theta, \varphi) \quad (2)$$

$$C_n^m = a_n^m + b_n^m i \quad (3)$$

$$C_n^{-m} = (-1)^m (C_n^m)^* \quad (4)$$

$$Y_n^m(\theta, \varphi) = \sqrt{\frac{(2n+1)(n-m)!}{4n(n+m)!}} P_n^m(\cos\theta) e^{im\varphi} \quad (5)$$

where θ is a colatitude angle, which has a domain of definition of [0, π], φ is an azimuth angle, which has a domain of definition of [0, 2π], $$C_n^m$$

is a coefficient corresponding to the spherical series of an n-order and m-degree spherical harmonic function, $$a_n^m$$

and $$b_n^m$$

are the real part and the imaginary part of the spherical harmonic function coefficient, respectively, (•)* is the conjugate transpose, and $$Y_n^m$$

is the spherical series of an n-order and m-degree spherical harmonic function.

$$P_n^m$$

is the corresponding n-order and m-degree legendre polynomial, and $e^{im\varphi}$ is its corresponding complex index;

$$C_n^{-m}$$

is a coefficient corresponding to the spherical series of an n-order and −m-degree spherical harmonic function, and i is an imaginary unit.

S3: a probability of railway ballast particles is characterized.

The probability of railway ballast particles is characterized, which specifically includes the following steps S31-S33.

S31: the spherical harmonic function coefficient set $$\hat{C}_{j,n}^m$$

obtained in Step S2 is substituted into Formula (6) to calculate and solve the spherical harmonic function spectrum $L_{j,n}$;

$$L_{j,n} = \sqrt{\sum_{m=-n}^{n} \|\hat{C}_{j,n}^m\|^2} \quad n = 0, 1, \ldots, N \quad (6)$$

where $L_{j,n}$ is an n-order spherical harmonic function spectrum of a j-th particle, $$\hat{C}_{j,n}^m$$

is an n-order and m-degree spherical harmonic function coefficient of a j-th particle, and $\|\cdot\|$ is a second-order Euclidean norm of a spherical harmonic coefficient vector.

S32: statistical analysis of a frequency histogram is carried out on $L_1$-$L_{15}$ of 300 railway ballast particles, the distribution approximately follows the gamma distribution, and the gamma distribution is selected for fitting.

S33: through comparative analysis, the gamma distribution is selected to construct a marginal probability density function $f = f_1(l_1), f_2(l_2), \ldots, f_n(l_n)$ of the spherical harmonic function spectrum of each order, in which the shape parameter ($\alpha$) and the scale coefficient ($\beta$) of the gamma distribution are shown in Table 1, thus characterizing the probability of the spherical harmonic function spectrum of each order of the railway ballast particles. $f_n(l_n)$ is a marginal probability density function the n order spherical harmonic function spectrum.

TABLE 1

Gamma distribution parameters of the spherical harmonic function spectrum

| Spherical harmonic function spectrum | α | β |
|---|---|---|
| L1 | 3.27 | 1.06 |
| L2 | 10.33 | 1.42 |
| L3 | 1.41 | 0.69 |
| L4 | 15.19 | 0.36 |
| L5 | 12.12 | 0.34 |
| L6 | 18.03 | 0.17 |
| L7 | 17.71 | 0.13 |
| L8 | 17.53 | 0.11 |
| L9 | 18.10 | 0.09 |
| L10 | 16.85 | 0.08 |
| L11 | 18.07 | 0.06 |
| L12 | 17.05 | 0.06 |
| L13 | 13.76 | 0.07 |
| L14 | 11.50 | 0.08 |
| L15 | 12.01 | 0.07 |

S4: the railway ballast particles are randomly generated.

The railway ballast particles are randomly generated, which specifically includes the following steps S41-S43.

S41: a joint probability density function of the spherical harmonic function spectrum is established through Nataf theory according to the obtained marginal probability density function $f = f_1(l_1), f_2(l_2), \ldots, f_n(l_n)$ of the spherical harmonic function spectrum of each order, and the joint probability density function of the spherical harmonic function is obtained, as shown in Formula (7):

$$f(L_1, L_2, \ldots, L_N) = f_1(l_1) f_2(l_2) \ldots f_n(l_n) \frac{\phi_n(y, \rho_0)}{\phi(y_1)\phi(y_2) \ldots \phi(y_n)} \quad (7)$$

where $\phi_n(y, \rho_0)$ is the joint probability density function of the standard normal distribution, and $\rho_0$ is a correlation coefficient of n-dimensional standard normal distribution. $\phi(y_n)$ is marginal probability density function of each order corresponding to the standard normal distribution.

S42: the spherical harmonic function spectrum $\hat{L}_q = [\hat{L}_{1,q}, \hat{L}_{2,q}, \ldots, \hat{L}_{n,q}]^T$ of the target number $N_L$ is obtained according to the obtained joint probability density function, $q = 1, 2, \ldots, N_L$.

A relationship between 16 spherical harmonic function spectra and 256 spherical harmonic function coefficients is established to generate particles, wherein the specific conversion formulas are as shown in Formula (8) and Formula (9):

$$\hat{C}_{n,q}^m = \begin{cases} \dfrac{\hat{L}_{n,q}}{\bar{L}_{n,q}}(a_{n,q}^m + b_{n,q}^m i) & m > 0 \\ \dfrac{\hat{L}_{n,q}}{\bar{L}_{n,q}}(a_{n,q}^0) & m = 0 \\ \dfrac{\hat{L}_{n,q}}{\bar{L}_{n,q}}(-1)^m (a_{n,q}^m + b_{n,q}^m i) & m < 0 \end{cases} \quad (8)$$

$$\bar{L}_{n,q} = \sqrt{(a_{n,q}^0)^2 + \sum_{m=1}^{n}\left[2(a_{n,q}^0)^2 + 2(b_{n,q}^0)^2\right]} \quad (9)$$

where $$a_{n,q}^m$$

and $$b_{n,q}^m$$

are random numbers following the uniform distribution from 0 to 1.

S43: the railway ballast particles are generated rapidly and randomly according to the generated spherical harmonic function coefficients $$\hat{C}_{n,q}^m$$

in combination with Formula (2) to Formula (5).

The method of the present disclosure will be compared with the current methods of reconstructing and accurately characterizing railway ballast particle profiles from two aspects of accurate characterization and random generation of the railway ballast profiles. At present, the railway ballast profile sample library only contains dozens of typical railway ballast profiles, so that it is difficult to describe the uncertainty of the railway ballasts. In order to generate the three-dimensional profiles, the three-dimensional profiles are inverted through the two-dimensional profiles, the error will be enlarged, and it is difficult to ensure the consistency of characteristics between the generated railway ballast profiles and the actual railway ballast profiles. The method includes randomly selecting 300 railway ballasts for scanning to obtain railway ballast profile samples, and introducing the spherical harmonic function theory to carry out three-dimensional reconstruction on the railway ballast profiles. When the order of the spherical harmonic function is up to 15, the restored railway ballast profiles are more accurate. At the same time, the joint probability density function of a spherical harmonic function spectrum is established based on Nataf change to characterize the uncertainty of the railway ballast profiles and generate railway ballast particles randomly and rapidly.

Although the present disclosure has been described in detail with reference to the above embodiments, it is still possible for those skilled in the art to modify the technical solution described in the above embodiments or to replace some technical features equivalently. Any modification, equivalent replacement, improvement, etc. made within the spirit and the principle of the present disclosure should be included in the scope of protection of the present disclosure.

The invention claimed is:

1. A method of reconstructing and randomly generating realistic three-dimensional (3D) profiles of railway ballast particles, comprising the following steps:

S1: obtaining three-dimensional profile data of railway ballasts;

S2: reconstructing railway ballast profiles based on a spherical harmonic function method;

wherein step S2 comprises: selecting N=15 to carry out research work based on a theoretical method of a spherical harmonic function, according to space coordinate information set $$S_j = \left(r_j^k, \theta_j^k, \varphi_j^k\right)$$

of a surface point cloud in a spherical coordinate system, solving a spherical harmonic function coefficient of each of the railway ballast particles by least square fitting, and obtaining a spherical harmonic function coefficient set $$\hat{C}_{j,n}^m$$

with 300 samples, wherein the spherical harmonic function coefficient set $$\hat{C}_{j,n}^m$$

is defined by a following formula:

$$\hat{C}_{j,n}^m = \left(\hat{C}_{j,n}^{-n}, \hat{C}_{j,n}^{-n+1}, \ldots, \hat{C}_{j,n}^0, \ldots, \hat{C}_{j,n}^{n-1}, \hat{C}_{j,n}^n\right) \quad (1)$$

$$j = 1, 2, \ldots, 300; n = 0, 1, \ldots, 15$$

wherein j is a particle number, and n and m correspond to an order and degree of expansion of the spherical harmonic function, respectively; and reconstructing the railway ballast particles by substituting the spherical harmonic function coefficient set $$\hat{C}_{j,n}^m$$

into a following formula defined by a following formula:

$$r(\theta, \varphi) = \sum_{n=0}^{N} \sum_{m=-n}^{n} C_n^m Y_n^m(\theta, \varphi) \quad (2)$$

$$C_n^m = a_n^m + b_n^m i \quad (3)$$

$$C_n^{-m} = (-1)^m (C_n^m)^* \quad (4)$$

$$Y_n^m(\theta, \varphi) = \sqrt{\frac{(2n+1)(n-m)!}{4n(n+m)!}} P_n^m(\cos\theta) e^{im\varphi} \quad (5)$$

wherein $\theta$ is a colatitude angle having a domain of definition of $[0, \pi]$, $\varphi$ is an azimuth angle having a domain of definition of $[0, 2\pi]$, $$C_n^m$$

is a coefficient corresponding to a spherical series of an n-order and m-degree spherical harmonic function, $$a_n^m$$

and $$b_n^m$$

are a real part and an imaginary part of the spherical harmonic function coefficient, respectively, $(\bullet)^*$ is a conjugate transpose, and $$Y_n^m$$

is the spherical series of the n-order and m-degree spherical harmonic function;

S3: characterizing a probability of the railway ballast particles; and

S4: randomly generating the railway ballast particles; wherein step S4 comprises:

S41: establishing a joint probability density function of a spherical harmonic function spectrum through Nataf theory according to a marginal probability density function $f = f_1(l_1), f_2(l_2), \ldots, f_n(l_n)$ of a spherical harmonic function spectrum of each order to obtain the joint probability density function of the spherical harmonic function defined by formula (7):

$$f(L_1, L_2, \ldots, L_N) = f_1(l_1) f_2(l_2) \ldots f_n(l_n) \frac{\phi_n(y, \rho_0)}{\phi(y_1)\phi(y_2)\ldots\phi(y_n)} \quad (7)$$

wherein $\phi_n(y, \rho_0)$ is a joint probability density function of a standard normal distribution, and $\rho_0$ is a correlation coefficient of an n-dimensional standard normal distribution;

S42: obtaining a spherical harmonic function spectrum $\hat{L}_q = [\hat{L}_{1,q}, \hat{L}_{2,q}, \ldots, \hat{L}_{n,q}]^T$ of a target number $N_L$ according to the joint probability density function, q=1, 2, . . . , $N_L$;

establishing a relationship between 16 spherical harmonic function spectra and 256 spherical harmonic function coefficients to generate particles, wherein conversion formulas are as shown in formula (8) and formula (9):

$$\hat{C}_{n,q}^{m} = \begin{cases} \dfrac{\hat{L}_{n,q}}{\overline{L}_{n,q}}(a_{n,q}^{m} + b_{n,q}^{m}i) & m > 0 \\ \dfrac{\hat{L}_{n,q}}{\overline{L}_{n,q}}(a_{n,q}^{0}) & m = 0 \\ \dfrac{\hat{L}_{n,q}}{\overline{L}_{n,q}}(-1)^{m}(a_{n,q}^{m} + b_{n,q}^{m}i) & m < 0 \end{cases} \quad (8)$$

$$\overline{L}_{n,q} = \sqrt{(a_{n,q}^{0})^{2} + \sum_{m=1}^{n}[2(a_{n,q}^{0})^{2} + 2(b_{n,q}^{0})^{2}]} \quad (9)$$

wherein $a_{n,q}^{m}$ and $b_{n,q}^{m}$ are random numbers following a uniform distribution from 0 to 1;

S43: generating the 3D railway ballast particles rapidly and randomly according to the spherical harmonic function coefficient $C_{n,q}^{\hat{m}}$ in combination with formula (2) to formula (5) to be used in a discrete element simulation; wherein the result of the simulation is used to evaluate an interaction between railway ballasts and macroscopic mechanical behavior of a ballast bed to ensure physical railway safety;

wherein step S1 comprises: randomly selecting 300 railway ballasts, rotating a base to rotate railway ballasts by 360 degrees along an axis perpendicular to the base, setting target points on surfaces of the railway ballasts at a same time, rotating the railway ballast particles for a plurality of times and scanning the railway ballast particles at different angles for a plurality of times, splicing results of scanning for a plurality of times in a target point positioning manner, and obtaining a space coordinate information set $V_{j} = (x_{j}^{k}, y_{j}^{k}, z_{j}^{k})$ of a surface point cloud in a Cartesian coordinate system, and converting the space coordinate information set of the surface point cloud in the Cartesian coordinate system into the space coordinate information set $S_{j} = (r_{j}^{k}, \theta_{j}^{k}, \varphi_{j}^{k})$ in the spherical coordinate system, wherein j is the particle number, and k is a point cloud number.

2. The method of reconstructing and randomly generating the three-dimensional profiles of railway ballast particles according to claim 1, wherein step S3 comprises:

S31: substituting the spherical harmonic function coefficient set $\hat{C}_{j,n}^{m}$ into formula (6) to calculate and solve a spherical harmonic function spectrum $L_{j,n}$;

$$L_{j,n} = \sqrt{\sum_{m=-n}^{n}\|\hat{C}_{j,n}^{m}\|^{2}} \quad n = 0, 1, \ldots, N \quad (6)$$

wherein $L_{j,n}$ is an n-order spherical harmonic function spectrum of a j-th particle, $\hat{C}_{j,n}^{m}$ is an n-order and m-degree spherical harmonic function coefficient of the j-th particle, and $\|\cdot\|$ is a second-order Euclidean norm of a spherical harmonic coefficient vector;

S32: carrying out statistical analysis of a frequency histogram on $L_1$-$L_{15}$ of 300 railway ballast particles, and due to a distribution approximately a gamma distribution, selecting the gamma distribution for fitting; and S33: selecting the gamma distribution to construct a marginal probability density function $f = f_1(l_1)$, $f_2(l_2), \ldots, f_n(l_n)$ of a spherical harmonic function spectrum of each order, and characterizing a probability of the spherical harmonic function spectrum of each order of the railway ballast particles.

* * * * *